US008391239B2

(12) United States Patent
Tenny et al.

(10) Patent No.: US 8,391,239 B2
(45) Date of Patent: Mar. 5, 2013

(54) BEARER COUNT ALIGNMENT DURING INTER-RAT HANDOVER

(75) Inventors: Nathan Edward Tenny, Poway, CA (US); Arnaud Meylan, Juziers (FR)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 12/563,827

(22) Filed: Sep. 21, 2009

(65) Prior Publication Data

US 2010/0075679 A1 Mar. 25, 2010

Related U.S. Application Data

(60) Provisional application No. 61/099,117, filed on Sep. 22, 2008.

(51) Int. Cl.
*H04W 36/26* (2009.01)
*H04W 72/04* (2009.01)
*H04W 36/00* (2009.01)

(52) U.S. Cl. ........ 370/331; 370/280; 370/329; 370/338; 455/436

(58) Field of Classification Search .................. 370/328, 370/329–330, 342–343, 331, 332, 280, 294–295, 370/347; 455/436, 437–439
See application file for complete search history.

(56) References Cited

U.S. PATENT DOCUMENTS

| | | | | |
|---|---|---|---|---|
| 7,254,392 B2 * | 8/2007 | Kauhanen | | 455/436 |
| 7,551,576 B2 * | 6/2009 | Ahmavaara | | 370/328 |
| 7,668,147 B2 * | 2/2010 | Lindsay et al. | | 370/347 |
| 7,688,147 B1 * | 3/2010 | Hoover | | 330/301 |
| 7,953,042 B2 * | 5/2011 | Kwak et al. | | 370/331 |
| 7,978,634 B2 * | 7/2011 | Yang et al. | | 370/280 |
| 2002/0160785 A1 * | 10/2002 | Ovesjo et al. | | 455/453 |
| 2004/0156329 A1 * | 8/2004 | Bck et al. | | 370/328 |
| 2006/0229102 A1 * | 10/2006 | Kitazoe et al. | | 455/560 |
| 2008/0025263 A1 * | 1/2008 | Pelkonen | | 370/332 |
| 2008/0254804 A1 * | 10/2008 | Lohr et al. | | 455/442 |
| 2009/0042576 A1 * | 2/2009 | Mukherjee et al. | | 455/436 |
| 2009/0129342 A1 * | 5/2009 | Hwang et al. | | 370/331 |
| 2009/0156215 A1 * | 6/2009 | Pitkamaki | | 455/437 |

(Continued)

FOREIGN PATENT DOCUMENTS

| | | |
|---|---|---|
| JP | 2004524745 A | 8/2004 |
| JP | 2008519520 A | 6/2008 |

(Continued)

OTHER PUBLICATIONS

3GPP: "Evolved Universal Terrestrial Radio Access (E-UTRA); Radio Resource Control (RRC); Protocol specification (Release 8)" 3GPP TS 36.331 V8.3.0 (Sep. 2008), [Online] pp. 1,46-47-66,76-79, XP002565976 Retrieved from the Internet : URL: http://www.3gpp.org/ftp/Specs/archive/36_series/36.331/> [ retrieved on Jan. 28, 2010].

(Continued)

*Primary Examiner* — Kwang B Yao
*Assistant Examiner* — Candal Elpenord
(74) *Attorney, Agent, or Firm* — John J. Ketchum

(57) ABSTRACT

Certain aspects of the present disclosure provide a method for bearer count alignment during handover of a user equipment (UE) from a first radio access technology (RAT) to a second RAT. The UE establishes radio resource control (RRC) connections with the second RAT and transmits data radio bearer (DRB) capability of the UE to the second network. The second network utilizes this information to set up the DRBs with the UE.

44 Claims, 8 Drawing Sheets

U.S. PATENT DOCUMENTS

2009/0175239 A1* 7/2009 Grinshpun et al. ............ 370/331
2009/0316656 A1* 12/2009 Zhao et al. .................... 370/331

FOREIGN PATENT DOCUMENTS

| JP | 2009088957 A | 4/2009 |
|----|--------------|--------|
| WO | WO02067617 A1 | 8/2002 |
| WO | WO2007144757 A2 | 12/2007 |

OTHER PUBLICATIONS

3GPP: "General Packet Radio Service (GPRS) enhancements for Evolved Universal Terrestrial Radio Access Network (E-UTRAN) access (Release 8)" 3GPP TS 23.401 V8.2.0 (Jun. 2008), pp. 111-112, XP002565977 Retrieved from the Internet : URL: http://www.3gpp.org/ftp/Specs/archive/23_series/23.401/> [retrieved on Jan. 28, 2010].

International Search Report and Written Opinion—PCT/US2009/057900—ISA/EPO—Feb. 10, 2010.

Vodafone: "UE capability handling in LTE/SAE" 3GPP Draft; S2-084434, 3RD.

Generation Partnership Project (3GPP), Mobile Competence Centre ; 650, Route Des Lucioles ; F-06921 Sophia-Antipolis Cedex ; France, vol. SA WG2, no. Montreal; 20080616, Jun. 16, 2008), XP050266600 [retrieved on Jun. 16, 2008].

* cited by examiner

BEARER COUNT ALIGNMENT DURING INTER-RAT HANDOVER

CLAIM OF PRIORITY UNDER 35 U.S.C. §119

This application claims benefit of U.S. provisional patent application Ser. No. 61/099,117 filed Sep. 22, 2008, and assigned to the assignee hereof and hereby expressly incorporated by reference herein.

TECHNICAL FIELD

Certain aspects of the present disclosure generally relate to wireless communication and, more particularly, to a technique to align bearers in different layers of radio access technologies (RAT) during handover from a first RAT to a second RAT.

BACKGROUND

Wireless communication systems are widely deployed to provide various types of communication content, such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

Third-generation networks and user equipments (UE) are widely used throughout the world. Inter system handover between Global System for Mobile Communications (GSM) and Universal Terrestrial Radio Access Network (UTRAN) are expected to play an increasingly important role, as many third-generation UEs will be dual-mode UE capable of performing in both Generalized Packet Radio Services (GPRS) networks and Evolved UMTS Terrestrial Radio Access networks (E-UTRAN). Each time such a dual-mode UE moves between the two networks, an inter-system handover (i.e., inter-RAT (radio access technology)) is performed. For example, an inter-RAT handover to E-UTRAN procedure may hand the UE over from a GSM system to an E-UTRAN system. Therefore, a plurality of different RATs, such as TDMA, WCDMA, CDMA2000 and WLAN may coexist in one geographical area.

In order to enable almost seamless services for the endusers, third generation dual-mode UEs may be able to communicate with two RATs. As a result, both the UE and the radio access network have to be able to support handover between the two technologies.

Various problems are associated with such inter-RAT handovers, typically due to the inherent differences in the radio access technologies. For instance, in GPRS and UMTS, a UE may support up to eleven packet data protocol (PDP) contexts. A PDP context contains a user's session information and is registered in the Gateway GPRS Support Node (GGSN) in a GPRS system. If a dual-mode UE performs an inter-RAT handover from, for instance, either a GPRS system or a UMTS system, to E-UTRAN, the PDP contexts are translated into evolved packet system (EPS) bearers in the long term evolution (LTE) evolved packet core (EPC) system via a one-to-one mapping. The EPC core-network specifications for an LTE system require that a UE support eleven EPS bearers. In the LTE access network, EPS bearers are subsequently mapped one-to-one to data radio bearers (DRB). This causes a misalignment between the numbers of bearers supported by different stratum of the LTE system since the specifications for the radio resource control layer of the UE mandate only that the UE support eight DRBs.

Therefore, there is a need in the art for a technique for handling the mismatch between the numbers of bearers supported in different stratum of a radio access technology, such as an LTE system.

SUMMARY

Certain aspects of the present disclosure provide a method for wireless communications by a user equipment (UE). The method generally includes receiving a message from a first network to handover to a second network, establishing radio resource control (RRC) connections with the second network, and transmitting data radio bearer (DRB) capability of the UE to the second network, wherein the DRB capability includes a number of DRBs that are supported by the UE.

Certain aspects of the present disclosure provide a method for wireless communications by a first network. The method generally includes receiving a notification of a handover of a user equipment and the context associated with the UE from a second network, wherein the first network is different from the second network, establishing radio resource control (RRC) connection with the UE, receiving data radio bearer (DRB) capability of the UE, and setting up DRBs with the UE based on the received UE context, wherein the number of the DRBs is equal to the DRB capability of the UE.

Certain aspects of the present disclosure provide an apparatus for wireless communications by a user equipment (UE). The apparatus generally includes logic for receiving a message from a first network to handover to a second network, logic for establishing radio resource control (RRC) connections with the second network, and logic for transmitting data radio bearer (DRB) capability of the UE to the second network, wherein the DRB capability includes a number of DRBs that are supported by the UE.

Certain aspects of the present disclosure provide an apparatus for wireless communications by a first network. The apparatus generally includes logic for receiving a notification of a handover of a user equipment (UE) and the context associated with the UE from a second network, wherein the first network is different from the second network, logic for establishing radio resource control (RRC) connection with the UE, logic for receiving data radio bearer (DRB) capability of the UE, and logic for setting up DRBs with the UE based on the received UE context, wherein the number of the DRBs is equal to the DRB capability of the UE.

Certain aspects of the present disclosure provide an apparatus for wireless communications by a user equipment (UE). The apparatus generally includes means for receiving a message from a first network to handover to a second network, means for establishing radio resource control (RRC) connections with the second network, and means for transmitting data radio bearer (DRB) capability of the UE to the second network, wherein the DRB capability includes a number of DRBs that are supported by the UE.

Certain aspects of the present disclosure provide an apparatus for wireless communications by a first network. The apparatus generally includes means for receiving a notification of a handover of a user equipment (UE) and the context associated with the UE from a second network, wherein the first network is different from the second network, means for establishing radio resource control (RRC) connection with the UE, means for receiving data radio bearer (DRB) capability of the UE, and means for setting up DRBs with the UE based on the received UE context, wherein the number of the DRBs is equal to the DRB capability of the UE.

Certain aspects provide a computer-program product for wireless communications by a user equipment, comprising a computer-readable medium having instructions stored thereon, the instructions being executable by one or more processors. The instructions generally include instructions for receiving a message from a first network to handover to a second network, instructions for establishing radio resource control (RRC) connections with the second network, and instructions for transmitting data radio bearer (DRB) capability of the UE to the second network, wherein the DRB capability includes a number of DRBs that are supported by the UE.

Certain aspects provide a computer-program product for wireless communications by a first network, comprising a computer-readable medium having instructions stored thereon, the instructions being executable by one or more processors. The instructions generally include instructions for receiving a notification of a handover of a user equipment (UE) and the context associated with the UE from a second network, wherein the first network is different from the second network, instructions for establishing radio resource control (RRC) connection with the UE, instructions for receiving data radio bearer (DRB) capability of the UE, and instructions for setting up DRBs with the UE based on the received UE context, wherein the number of the DRBs is equal to the DRB capability of the UE.

Certain aspects of the present disclosure provide an apparatus for wireless communications by a user equipment. The apparatus generally includes at least one processor configured to receive a message from a first network to handover to a second network, establish radio resource control (RRC) connections with the second network, and transmit data radio bearer (DRB) capability of the UE to the second network, wherein the DRB capability includes a number of DRBs that are supported by the UE.

Certain aspects of the present disclosure provide an apparatus for wireless communications by a first network. The apparatus generally includes at least one processor configured to receive a notification of a handover of a user equipment (UE) and the context associated with the UE from a second network, wherein the first network is different from the second network, establish radio resource control (RRC) connection with the UE, receive data radio bearer (DRB) capability of the UE, and set up DRBs with the UE based on the received UE context, wherein the number of the DRBs is equal to the DRB capability of the UE.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards.

A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
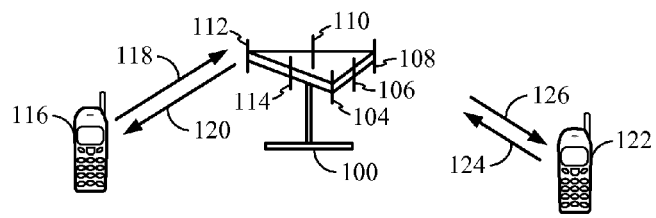
FIG. 1 illustrates a multiple access wireless communication system, in accordance with certain aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access point. In one embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, or some other terminology. An access terminal may also be called an access terminal, user equipment (UE), a wireless communication device, terminal, access terminal or some other terminology.

Figure 2:
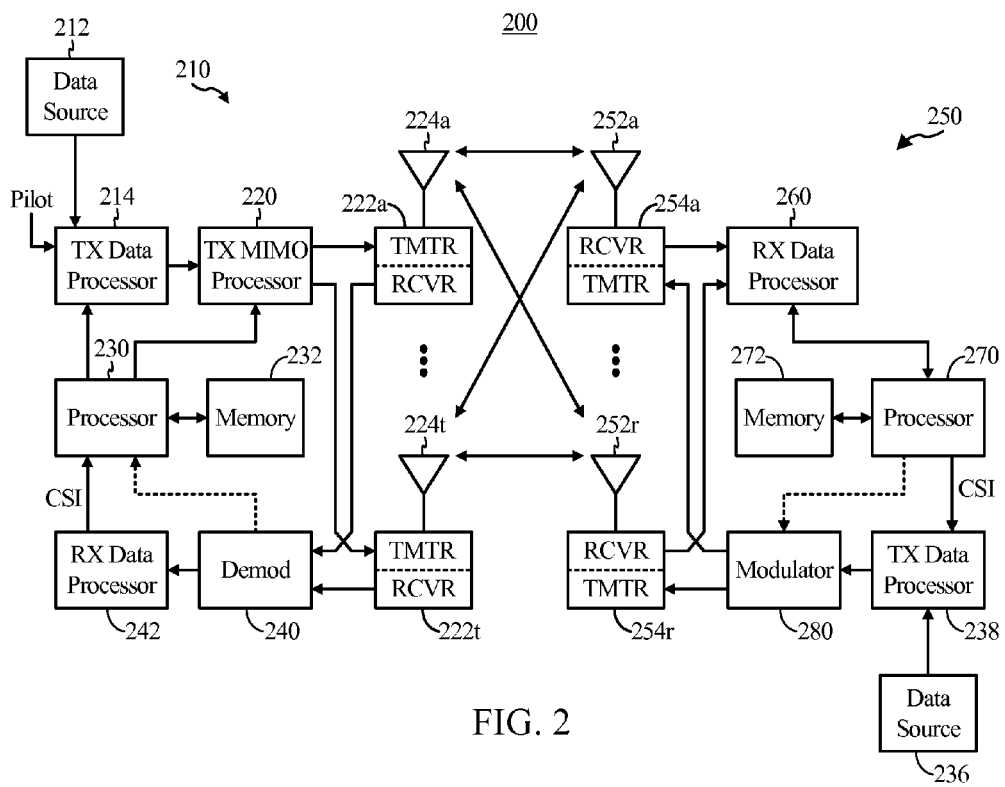
FIG. 2 illustrates a block diagram of a communication system, in accordance with certain aspects of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support a time division duplex (TDD) or a frequency division duplex (FDD) system. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QPSK), M-PSK, or quadrature amplitude modulation (M-QAM)) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 calculates the beamforming weights and processes the extracted message.

The channels between an access point and user equipments are classified into Control Channels and Traffic Channels. The Control Channels comprise Broadcast Control Channel (BCCH) which is a DL channel for broadcasting system control information, Paging Control Channel (PCCH) which is a DL channel that transfers paging information, Multicast Control Channel (MCCH) which is a Point-to-multipoint DL channel used for transmitting Multimedia Broadcast and Multicast Service (MBMS) scheduling and control information for one or several MTCHs.

Bearer Count Alignment During Inter-Rat Handover

In Generalized Packet Radio Services (GPRS) or Universal Mobile Telecommunication System (UMTS) networks, each packet data protocol (PDP) address is anchored at a Gateway GPRS Support Node (GGSN). All packet data traffic sent from the public packet data network for the PDP address goes through the gateway GGSN. Upon transferring data, a UE activates a PDP address to establish an association between the current serving GPRS Support Node (SGSN) of the UE and the GGSN that anchors the PDP address. The record kept by the SGSN and the GGSN regarding this association is the PDP context. In GPRS and UMTS networks, a UE may support up to eleven PDP contexts.

When a dual-mode UE hands over from one radio access technology (RAT) to another RAT (e.g., from GPRS or UMTS systems to E-UTRAN (Evolved-UMTS Terrestrial Radio Access Network), the PDP contexts are mapped to the new RAT.

For example, in the case of inter-RAT handover between GPRS and E-UTRAN networks, the PDP contexts are translated into evolved packet system (EPS) bearers in the LTE core network via a one-to-one mapping. Since the GPRS network supports up to eleven PDP contexts, and the core-network specifications for LTE assume that a UE can support eleven EPS bearers, the mapping can be performed without problem. The EPS bearers are in turn mapped one-to-one to data radio bearers (DRBs) in the access stratum of LTE. However, the radio resource control (RRC) specifications for LTE only require the UE to support eight DRBs. Therefore, the one-to-one mapping of EPS bearers to DRBs may not be possible if the number of EPS bearers is more than the number of supported DRBs.

Figure 3:
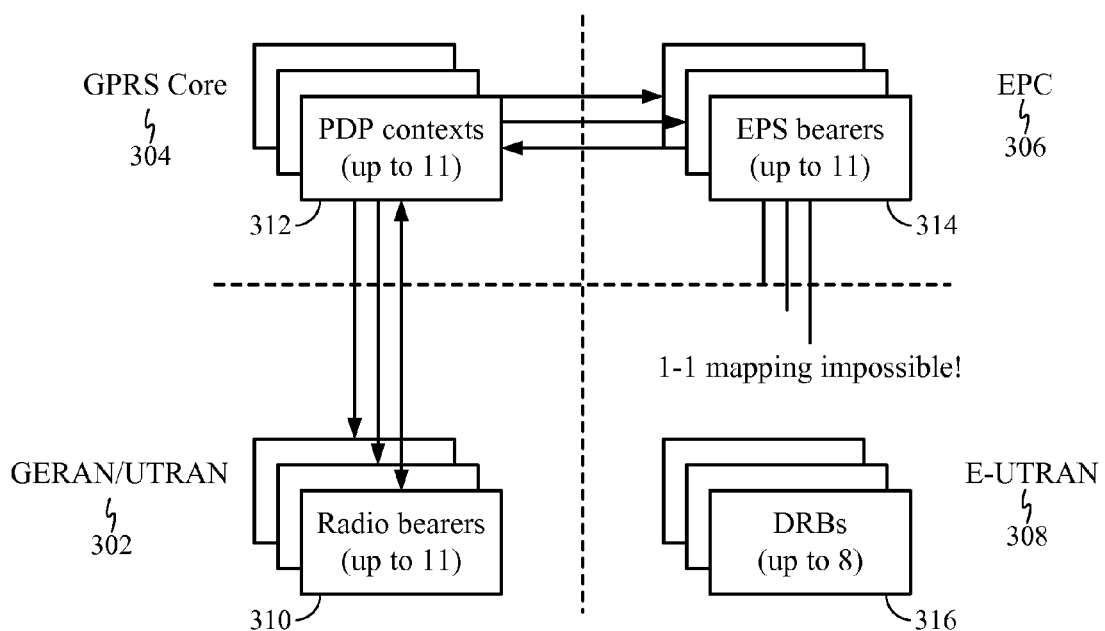
FIG. 3 illustrates an example schematic diagram of a mapping process between bearers in different layers of two radio access technologies (RAT) during handover, in accordance with certain aspects of the present disclosure.

FIG. 3 illustrates a schematic diagram of a mapping process between bearers in different layers of a GERAN/UTRAN network 302 to E-UTRAN network 308 during handover, in accordance with certain aspects of the present disclosure. GERAN stands for GSM EDGE Radio Access Network, GSM stands for Global System for Mobile Communications, and EDGE stands for Enhanced Data rates for GSM Evolution.

As illustrated in FIG. 3, the radio bearers 310 in GERAN/UTRAN network may be mapped one-to one to the PDP contexts 312 in the GPRS core 304. During the handover, the PDP contexts in GPRS core 304 may be mapped to the EPS bearers in the EPC core of LTE network. However, as shown in the figure, the one to one mapping between the EPS bearers in EPC core and the DRBs in the E-UTRAN may not be possible since up to eight DRBs are supported in current version of E-UTRAN network, whereas up to eleven EPS bearers are supported in EPC. As a result, when a UE coming from GERAN or UTRAN hands over into LTE, it may not be possible to establish enough data radio bearers for the EPS bearers that are needed to remap all of the existing PDP contexts.

One solution to the misalignment of the bearer counts in LTE could be requiring all the UEs to support eleven DRBs instead of eight. However, this would require changes in the UE implementations. In the current disclosure, a signaling approach is presented for alignment of the bearers during the handover between two radio access technologies.

Figure 4:
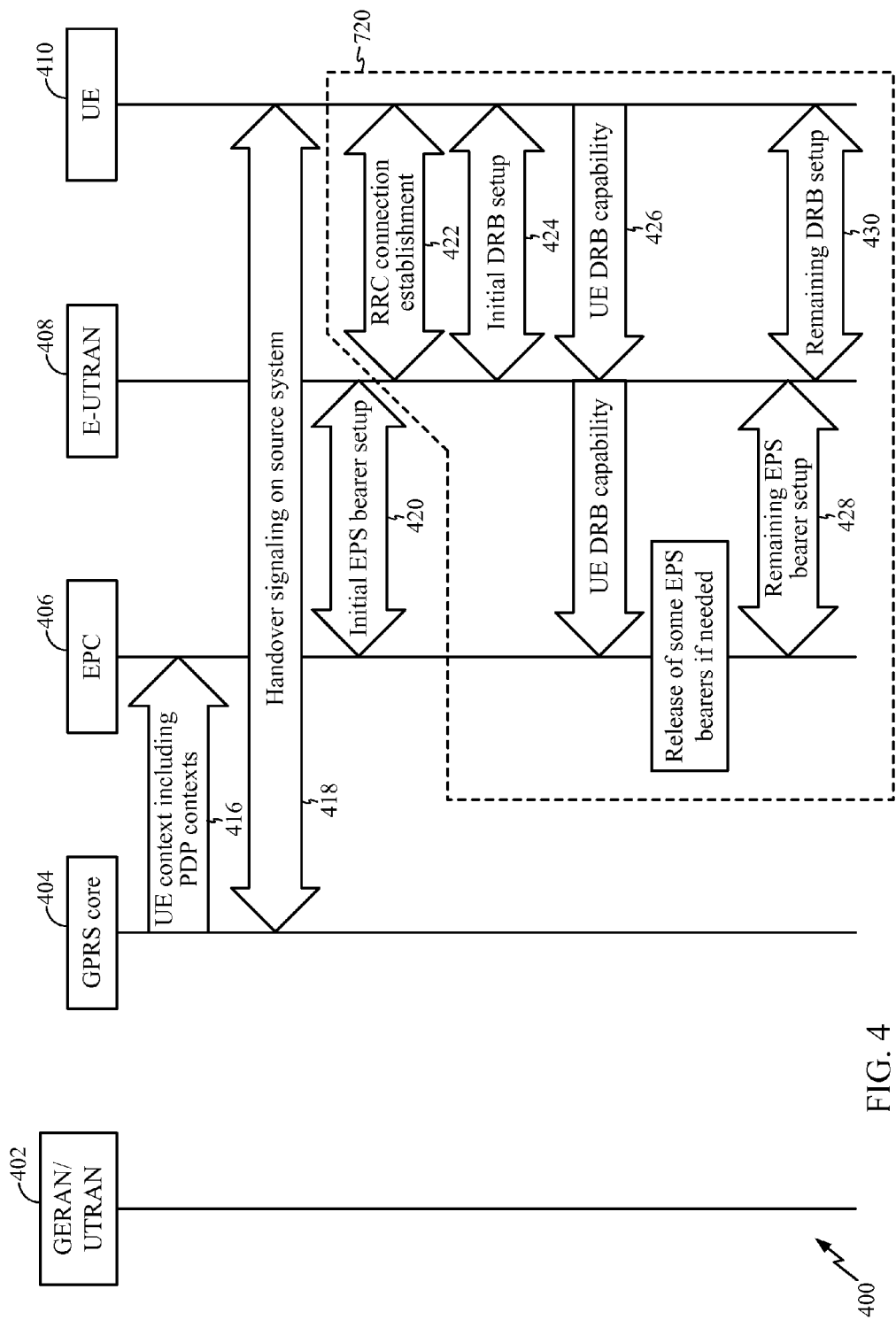
FIG. 4 illustrates a flow diagram for delivery of the DRB capability of a user equipment (UE) and setup of bearers, in accordance with certain aspects of the present disclosure.

FIG. 4 illustrates a flow diagram 400 for delivery of DRB capabilities of a UE and setup of bearers, in accordance with certain aspects of the present disclosure. A GERAN/UTRAN network 402 may initiate handover of the UE 410 to the E-UTRAN network 408. A GPRS core 404 notifies the target network of the handover and sends the UE context including PDP contexts to the EPC 406. The GERAN/UTRAN network may send handover signaling 418 to the UE to notify it of the handover.

The EPC core performs initial EPS bearer setup 420 with the E-UTRAN network. The "initial EPS bearer setup" stage establishes only EPS bearers that the network knows in advance the UE can support (i.e., no more than the minimum capability). The E-UTRAN network then establishes radio resource control (RRC) connection 422 with the UE. The UE performs initial DRB setup 424 with the E-UTRAN network and sends a report of its DRB capability 426 to the E-UTRAN network and the EPC core. Depending on the number of DRBs that the UE is able to support, the EPC may release some of the EPS bearers. If the UE is able to support more than the minimum number of the DRBs, then the EPC layer sets up the remaining EPS bearers 428 with the E-UTRAN network. The E-UTRAN network then sets up the remaining DRBs 430 with the UE.

For certain aspects of the present disclosure, the UE may be allowed to support more than the minimum number of eight DRBs. In addition, the UE may indicate the actual number of supported bearers as a UE capability to the target network. When the UE begins to receive service from the EPC, the network can consult this capability to determine if the UE can support all the EPS bearers that the network expects to set up for the inter-RAT handover.

For certain aspects, the EPC may wait to receive the DRB capability of the UE before setting up any EPS bearers. In an alternative aspect, however, for performance reasons, the EPC may establish some bearers as early as possible. For example, the EPC may setup a number of EPS bearers equal to the minimum number of EPS bearers supported by all the UEs before receiving the DRB capabilities of the UE. The EPC may setup the remaining EPS bearers after receiving information about the actual number of DRB bearers supported by the UE. The EPC may select which bearers should be set up in such an initial stage, based for example on bearer characteristics, such as latency tolerance or traffic class. Therefore, the bearers related to services with lower tolerance for interruption experience a lower impact from handover.

Figure 5:
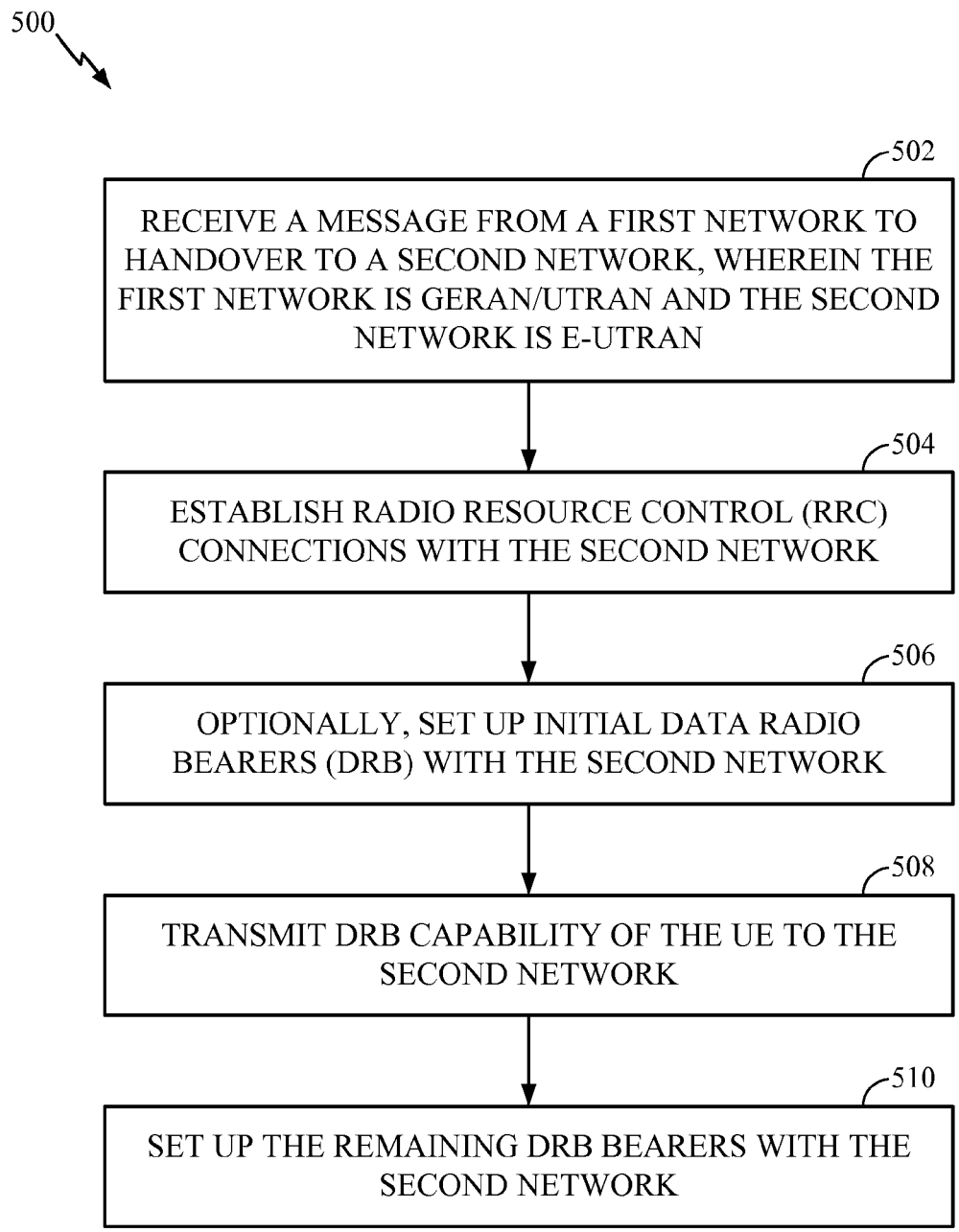
FIG. 5 illustrates example operations performed by a user equipment for bearer count alignment in inter-RAT handover, in accordance with certain aspects of the present disclosure.

FIG. 5 illustrates example operations performed by a user equipment for bearer count alignment in inter-RAT handover, in accordance with certain aspects of the present disclosure. At 502, the UE receives a message from a first network to handover to a second network, wherein the first network is GERAN/UTRAN and the second network is E-UTRAN. At 504, the UE establishes radio resource control (RRC) connections with the second network. At 506, the UE may set up initial DRB bearers with the second network, wherein the UE sets up a minimum number of DRBs in which the minimum number of DRBs are common among all the UEs. At 508, the UE transmits DRB capability of the UE to the second network. At 510, the UE sets up the remaining DRB bearers with the second network.

Figure 6:
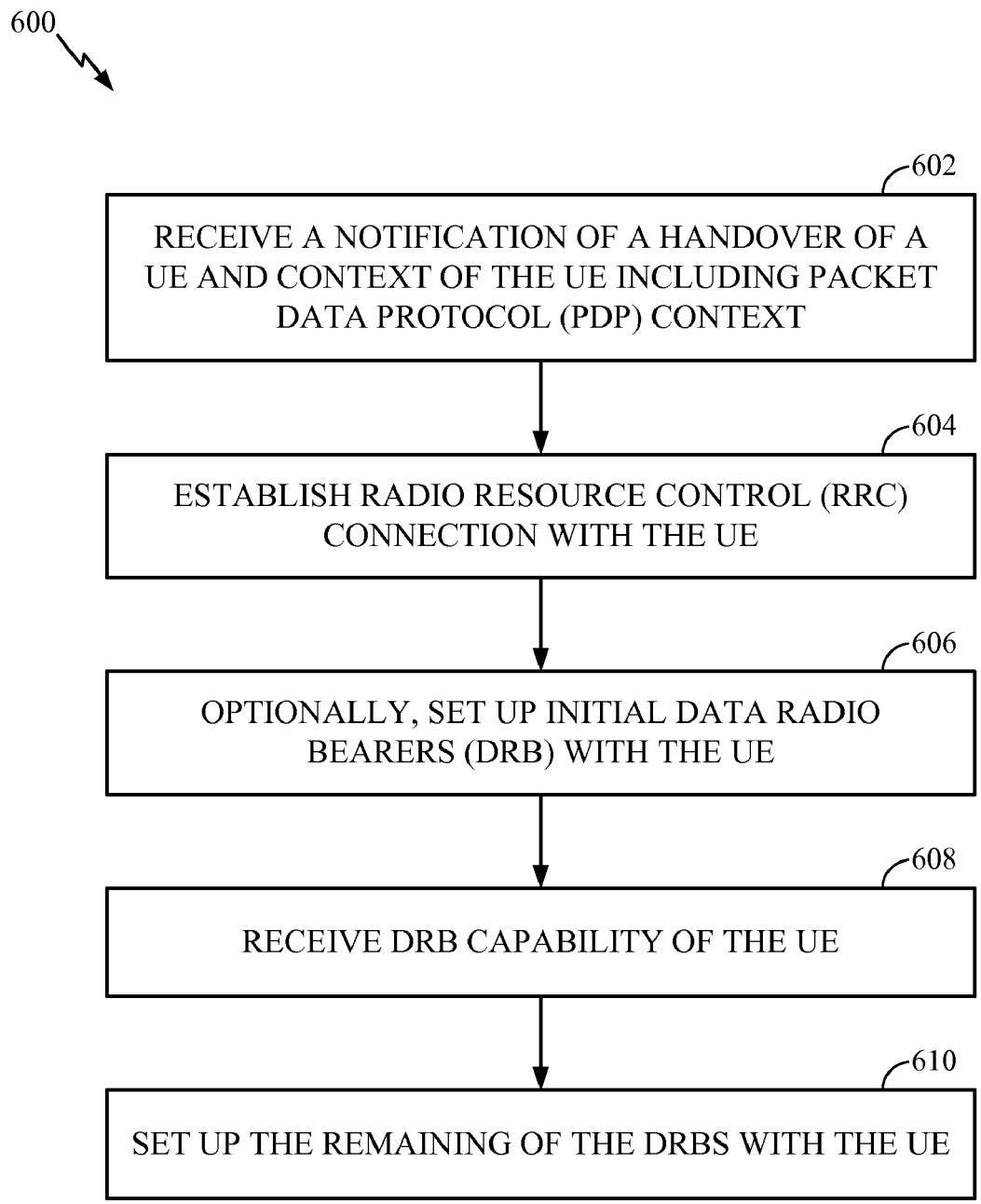
FIG. 6 illustrates example operations performed by a network for bearer count alignment in inter-RAT handover, in accordance with certain aspects of the present disclosure.

FIG. 6 illustrates example operations for bearer count alignment in inter-RAT handover, in accordance with certain aspects of the present disclosure. At 602, a first network receives a notification of a handover of a UE and context of the UE including PDP context from a second network, wherein the first network may be E-UTRAN and the second network may be GERAN/UTRAN. At 604, the first network establishes RRC connection with the UE. For certain aspects, the first network may receive DRB capability of the UE during RRC connection setup.

At 606, the first network may setup initial DRBs with the UE. For some aspects, the first network may wait until it receives the DRB capability of the UE before setting up any DRBs with the UE. At 608, the first network receives DRB capability of the UE. At 610, the first network sets up the remaining of the DRBs with the UE based on the capability of the UE.

In one aspect, the signaling of the UE DRB capability of the UE can be delivered using existing mechanisms for sending the UE capability to the network, either as an access stratum (AS) or non-access (NAS) capability. The access stratum may include the RRC, PDCP (Packet Data Convergence Protocol), RLC (Radio Link Control), and MAC (Medium Access Control) layers. The non-access stratum may include MM (Mobility Management) and SM (Session Management).

For certain aspects of the present disclosure, the DRB capability may be transferred separately during the RRC connection establishment process. This scheme may allow the network to take the decision on whether to release any EPS bearers, and set up those bearers that it can set up, as soon as the RRC connection is established.

Figure 7:
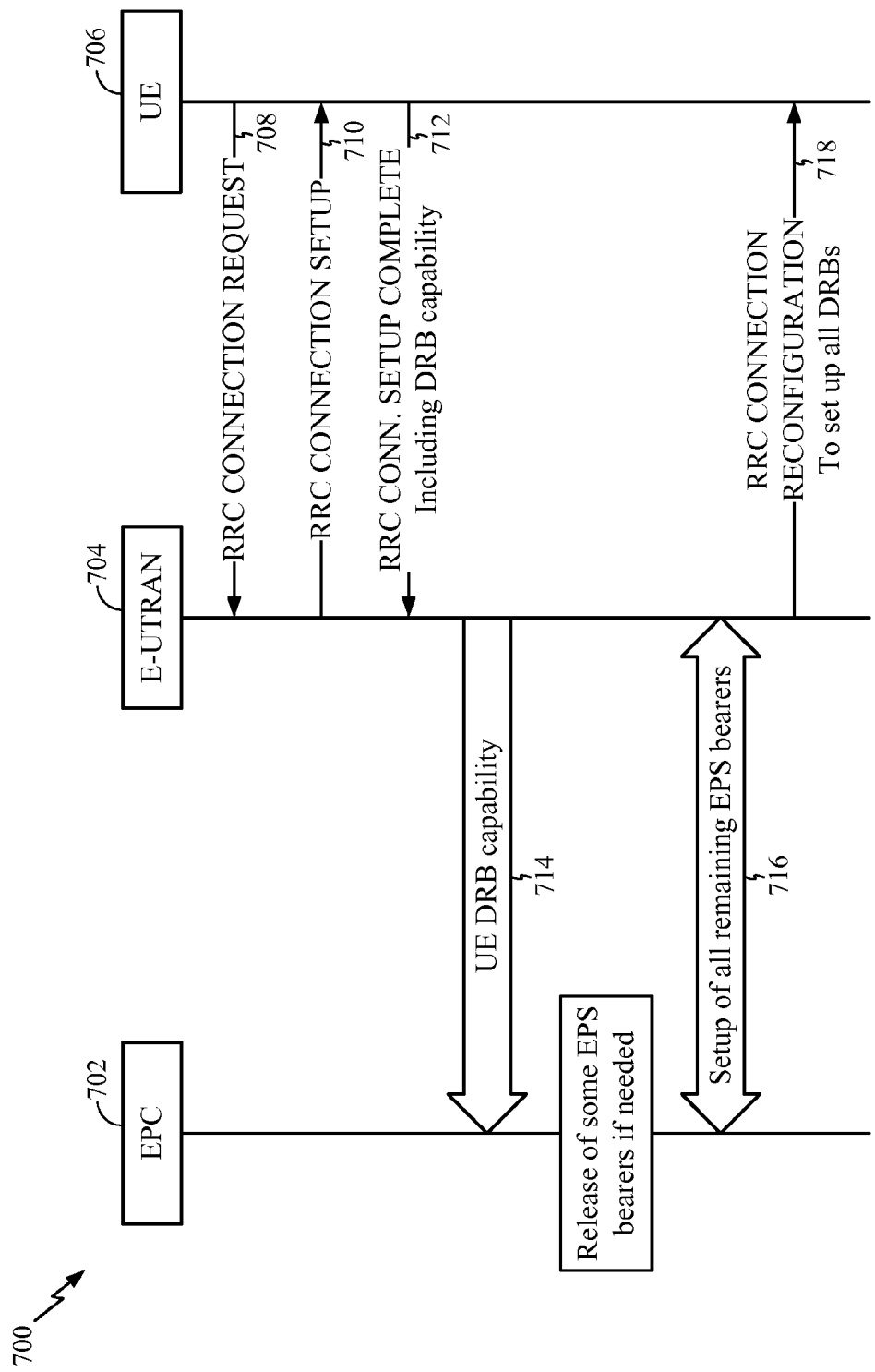
FIG. 7 illustrates an example of DRB capability transfer at connection setup between a UE and a network, in accordance with certain aspects of the present disclosure.

FIG. 7 illustrates an example flow diagram 700 of DRB capability transfer at connection setup between a UE 706 and a network, in accordance with certain aspects of the present disclosure. FIG. 7 shows an alternative method for performing a portion 720 of FIG. 4. The UE may send an RRC connection request 508 to the E-UTRAN network 704. The E-UTRAN sends a RRC connection setup message 710 to the UE. The UE sends an RRC CONNECTION SETUP COMPLETE message 712 to the target base station to indicate the completion of the RRC setup. In addition, the UE may include a field in the RRC CONNECTION SETUP COMPLETE message showing its DRB capability. The E-UTRAN layer may send a report of the UE DRB capability 714 to the EPC 702, from which the EPC may release some of the EPS bearers if the number of the DRBs supported by the UE is smaller than the number of EPS bearers. The E-UTRAN network may then perform RRC connection reconfiguration with the UE to setup all the DRBs 718.

For certain aspects of the present disclosure, the RRC CONNECTION SETUP COMPLETE message may include a field indicating the number of DRB bearers a UE can support. For some aspects, this field may have only one bit, representing two settings of supporting either 8 or 11 DRBs. In another exemplary aspect, the RRC CONNECTION SETUP COMPLETE message may include a two-bit field indicating that the UE supports an arbitrary number of DRBs. For example, the two bit field $N_{DRB}$ may indicate that the UE supports $8+N_{DRB}$ DRB bearers. The signaling format and the number of bits employed to show the number of supported DRBs may be adapted for future architectures to reflect the number of supported DRBs.

For certain aspects of the present disclosure, the DRB capability may be transferred in the RRC CONNECTION REQUEST message 708. However, the RRC CONNECTION REQUEST message 708 is more bandwidth-constrained than the RRC CONNECTION SETUP COMPLETE message 712.

Figure 5A:
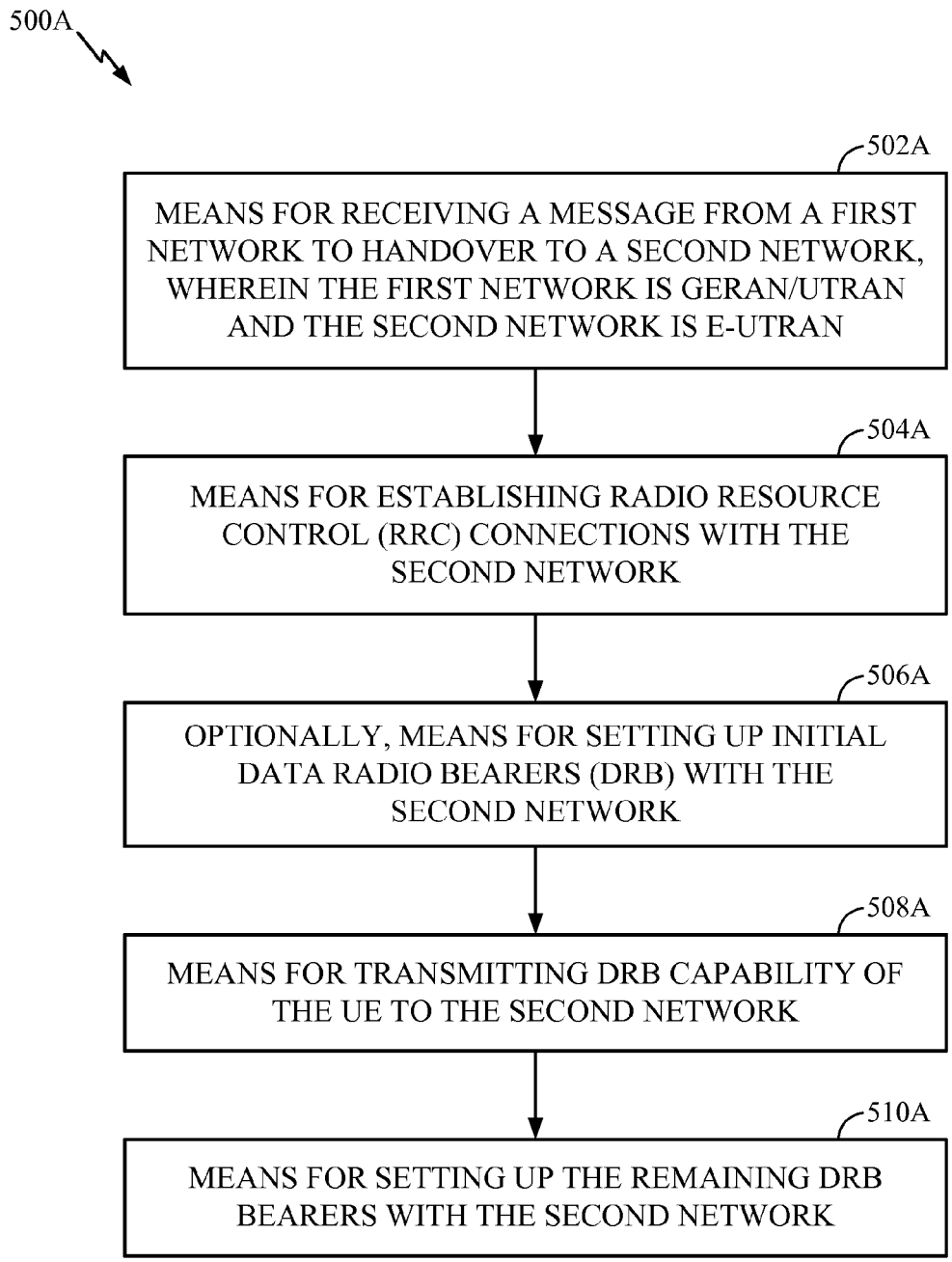
FIG. 5A illustrates example components capable of performing the operations illustrated in FIG. 5.
Figure 6A:
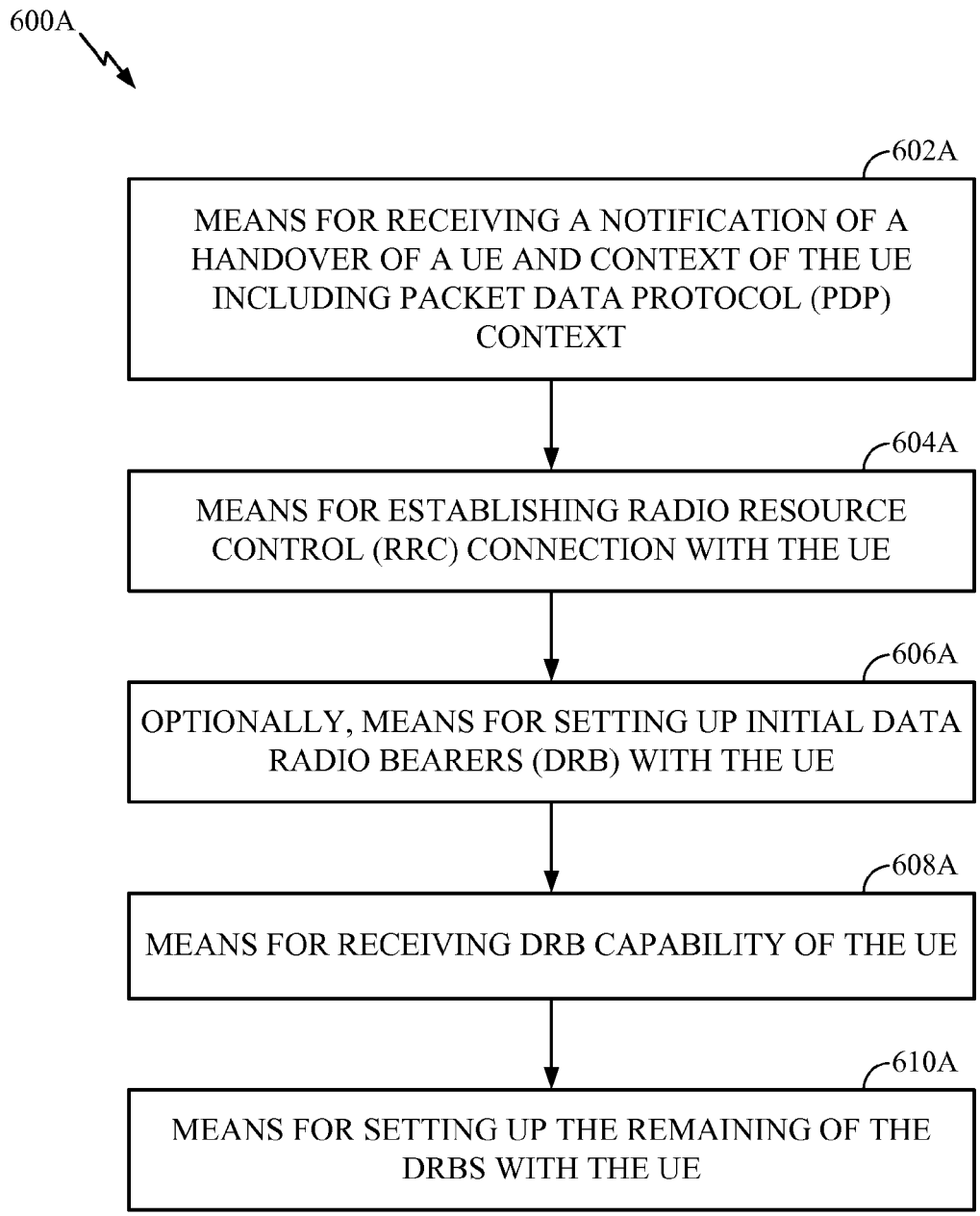
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 502-510 illustrated in FIG. 5 correspond to means-plus-function blocks 502A-510A illustrated in FIG. 5A. In addition, blocks 602-610 illustrated in FIG. 6 correspond to means-plus-function blocks 602A-610A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present invention, other and further embodiments of the invention may be devised without departing from the basic scope thereof, and the scope thereof is determined by the claims that follow.

The invention claimed is:

1. A method for wireless communications by a user equipment (UE), comprising:
receiving a message from a first network to handover to a second network;
establishing radio resource control (RRC) connections with the second network;
transmitting data radio bearer (DRB) capability of the UE to the second network, wherein the DRB capability includes a number of DRBs that are supported by the UE; and
setting up with the second network a first portion of the DRBs during a first period and a second portion of the DRBs during a second period, wherein the first period is before the second network receives the DRB capability of the UE and the second period is after the second network receives the DRB capability of the UE.

2. The method of claim 1, wherein the first network is GERAN, wherein GERAN stands for GSM EDGE Radio Access Network, GSM stands for Global System for Mobile Communications, EDGE stands for Enhanced Data rates for GSM Evolution.

3. The method of claim 1, wherein the first network is UTRAN, wherein UTRAN stands for UMTS Terrestrial Radio Access Network, and UMTS stands for Universal Mobile Telecommunications System.

4. The method of claim 1, wherein the second network is E-UTRAN, wherein E-UTRAN stands for Evolved UMTS Terrestrial Radio Access Network and UMTS stands for Universal Mobile Telecommunications System.

5. The method of claim 1, wherein the DRB capability of the UE is transmitted during RRC connection setup.

6. The method of claim 5, wherein the DRB capability of the UE is transmitted in a field within a RRC connection setup complete message, wherein the field contains one or more bits.

7. A method for wireless communications by a first network, comprising:
receiving a notification of a handover of a user equipment (UE) and a context associated with the UE from a second network, wherein the first network is different from the second network;
establishing radio resource control (RRC) connection with the UE;
receiving data radio bearer (DRB) capability of the UE; and
setting up DRBs with the UE based on the received UE context, wherein the number of the DRBs is equal to the DRB capability of the UE, and wherein a first portion of the DRBs is set up during a first period and a second portion of the DRBs is set up during a second period, wherein the first period is before the first network receives the DRB capability of the UE and the second period is after the first network receives the DRB capability of the UE.

8. The method of claim 7, wherein the second network is GERAN, wherein GERAN stands for GSM EDGE Radio Access Network, GSM stands for Global System for Mobile Communications, EDGE stands for Enhanced Data rates for GSM Evolution.

9. The method of claim 7, wherein the second network is UTRAN, wherein UTRAN stands for UMTS Terrestrial Radio Access Network, and UMTS stands for Universal Mobile Telecommunications System.

10. The method of claim 7, wherein the first network is E-UTRAN, wherein E-UTRAN stands for Evolved UMTS Terrestrial Radio Access Network and UMTS stands for Universal Mobile Telecommunications System.

11. The method of claim 7, wherein the DRB capability of the UE is received during the RRC connection setup.

12. The method of claim 10, wherein the DRB capability of the UE is received in a field with the RRC CONNECTION SETUP COMPLETE message, wherein the field contains one or more bits.

13. The method of claim 7, wherein setting up DRBs with the UE comprises:
setting up a minimum number of DRBs as soon as the connection is established between the UE and the first network, wherein the minimum number of DRBs is equal to the smallest number of DRBs supported by all the UEs; and
setting up the remaining DRBs after the first network receives information about the DRB capability of the UE, wherein the remaining DRBs are not included in the minimum number of DRBs that are setup previously.

14. The method of claim 13, wherein the minimum number of DRBs that are setup as soon as the connection is established between the UE and the first network are selected based at least on characteristics of the DRBs, and services with which the DRBs are associated.

15. The method of claim 14, wherein the characteristics of the DRBs comprise an indicator of the tolerance for interruption of a service associated with the DRB.

16. The method of claim 13, wherein at least one of the minimum number of DRBs, that are setup as soon as the connection is established between the UE and the second network, relates to a service that has less tolerance for interruption than the services associated with the remaining DRBs.

17. The method of claim 7, wherein the first network sets up all the DRBs with the UE at the same time.

18. The method of claim 7, wherein the context associated with the UE includes packet data protocol (PDP) context.

19. An apparatus for wireless communications by a user equipment (UE), comprising:
   logic for receiving a message from a first network to handover to a second network;
   logic for establishing radio resource control (RRC) connections with the second network;
   logic for transmitting data radio bearer (DRB) capability of the UE to the second network, wherein the DRB capability includes a number of DRBs that are supported by the UE; and
   logic for setting up with the second network a first portion of the DRBs during a first period and a second portion of the DRBs during a second period, wherein the first period is before the second network receives the DRB capability of the UE and the second period is after the second network receives the DRB capability of the UE.

20. The apparatus of claim 19, wherein the first network is GERAN, wherein GERAN stands for GSM EDGE Radio Access Network, GSM stands for Global System for Mobile Communications, EDGE stands for Enhanced Data rates for GSM Evolution.

21. The apparatus of claim 19, wherein the first network is UTRAN, wherein UTRAN stands for UMTS Terrestrial Radio Access Network, and UMTS stands for Universal Mobile Telecommunications System.

22. The apparatus of claim 19, wherein the second network is E-UTRAN, wherein E-UTRAN stands for Evolved UMTS Terrestrial Radio Access Network and UMTS stands for Universal Mobile Telecommunications System.

23. The apparatus of claim 19, wherein the DRB capability of the UE is transmitted during the RRC connection setup.

24. The apparatus of claim 23, wherein the DRB capability of the UE is transmitted in a field within the RRC connection setup complete message, wherein the field contains one or more bits.

25. An apparatus for wireless communications by a first network, comprising:
   logic for receiving a notification of a handover of a user equipment (UE) and a context associated with the UE from a second network, wherein the first network is different from the second network;
   logic for establishing radio resource control (RRC) connection with the UE;
   logic for receiving data radio bearer (DRB) capability of the UE; and
   logic for setting up DRBs with the UE based on the received UE context, wherein the number of the DRBs is equal to the DRB capability of the UE, and wherein a first portion of the DRBs is set up during a first period and a second portion of the DRBs is set up during a second period, wherein the first period is before the first network receives the DRB capability of the UE and the second period is after the first network receives the DRB capability of the UE.

26. The apparatus of claim 25, wherein the second network is GERAN, wherein GERAN stands for GSM EDGE Radio Access Network, GSM stands for Global System for Mobile Communications, EDGE stands for Enhanced Data rates for GSM Evolution.

27. The apparatus of claim 25, wherein the second network is UTRAN, wherein UTRAN stands for UMTS Terrestrial Radio Access Network, and UMTS stands for Universal Mobile Telecommunications System.

28. The apparatus of claim 25, wherein the first network is E-UTRAN, wherein E-UTRAN stands for Evolved UMTS Terrestrial Radio Access Network and UMTS stands for Universal Mobile Telecommunications System.

29. The apparatus of claim 25, wherein the DRB capability of the UE is received during the RRC connection setup.

30. The apparatus of claim 28, wherein the DRB capability of the UE is received in a field with the RRC CONNECTION SETUP COMPLETE message, wherein the field contains one or more bits.

31. The apparatus of claim 25, wherein the logic for setting up DRBs with the UE comprises:
   logic for setting up a minimum number of DRBs as soon as the connection is established between the UE and the first network, wherein the minimum number of DRBs is equal to the smallest number of DRBs supported by all the UEs; and
   logic for setting up the remaining DRBs after the first network receives information about the DRB capability of the UE, wherein the remaining DRBs are not included in the minimum number of DRBs that are setup previously.

32. The apparatus of claim 31, wherein the minimum number of DRBs that are setup as soon as the connection is established between the UE and the first network are selected based at least on characteristics of the DRBs, and services with which the DRBs are associated.

33. The apparatus of claim 32, wherein the characteristics of the DRBs comprise an indicator of the tolerance for interruption of a service associated with the DRB.

34. The apparatus of claim 31, wherein at least one of the minimum number of DRBs, that are setup as soon as the connection is established between the UE and the second network, relates to a service that has less tolerance for interruption than the services associated with the remaining DRBs.

35. The apparatus of claim 25, wherein the first network sets up all the DRBs with the UE at the same time.

36. The apparatus of claim 25, wherein the context associated with the UE includes packet data protocol (PDP) context.

37. An apparatus for wireless communications by a user equipment (UE), comprising:
   means for receiving a message from a first network to handover to a second network;
   means for establishing radio resource control (RRC) connections with the second network;
   means for transmitting data radio bearer (DRB) capability of the UE to the second network, wherein the DRB capability includes a number of DRBs that are supported by the UE; and
   means for setting up with the second network a first portion of the DRBs during a first period and a second portion of the DRBs during a second period, wherein the first period is before the second network receives the DRB capability of the UE and the second period is after the second network receives the DRB capability of the UE.

38. An apparatus for wireless communications by a first network, comprising:
   means for receiving a notification of a handover of a user equipment (UE) and a context associated with the UE from a second network, wherein the first network is different from the second network;
means for establishing radio resource control (RRC) connection with the UE;
means for receiving data radio bearer (DRB) capability of the UE; and
means for setting up DRBs with the UE based on the received UE context, wherein the number of the DRBs is equal to the DRB capability of the UE, and wherein a first portion of the DRBs is set up during a first period and a second portion of the DRBs is set up during a second period, wherein the first period is before the first network receives the DRB capability of the UE and the second period is after the first network receives the DRB capability of the UE.

39. A computer-program product for wireless communications by a user equipment (UE), comprising a non-transitory computer readable medium having instructions stored thereon, the instructions being executable by one or more processors and the instructions comprising:
instructions for receiving a message from a first network to handover to a second network;
instructions for establishing radio resource control (RRC) connections with the second network;
instructions for transmitting data radio bearer (DRB) capability of the UE to the second network, wherein the DRB capability includes a number of DRBs that are supported by the UE; and
instructions for setting up with the second network a first portion of the DRBs during a first period and a second portion of the DRBs during a second period, wherein the first period is before the second network receives the DRB capability of the UE and the second period is after the second network receives the DRB capability of the UE.

40. A computer-program product for wireless communications by a first network, comprising a non-transitory computer readable medium having instructions stored thereon, the instructions being executable by one or more processors and the instructions comprising:
instructions for receiving a notification of a handover of a user equipment (UE) and a context associated with the UE from a second network, wherein the first network is different from the second network;
instructions for establishing radio resource control (RRC) connection with the UE;
instructions for receiving data radio bearer (DRB) capability of the UE; and
instructions for setting up DRBs with the UE based on the received UE context, wherein the number of the DRBs is equal to the DRB capability of the UE, and wherein a first portion of the DRBs is set up during a first period and a second portion of the DRBs is set up during a second period, wherein the first period is before the first network receives the DRB capability of the UE and the second period is after the first network receives the DRB capability of the UE.

41. An apparatus for wireless communications by a user equipment (UE), comprising at least one processor configured to:
receive a message from a first network to handover to a second network;
establish radio resource control (RRC) connections with the second network;
transmit data radio bearer (DRB) capability of the UE to the second network, wherein the DRB capability includes a number of DRBs that are supported by the UE; and
set up with the second network a first portion of the DRBs during a first period and a second portion of the DRBs during a second period, wherein the first period is before the second network receives the DRB capability of the UE and the second period is after the second network receives the DRB capability of the UE.

42. An apparatus for wireless communications by a first network, comprising at least one processor configured to:
receive a notification of a handover of a user equipment (UE) and a context associated with the UE from a second network, wherein the first network is different from the second network;
establish radio resource control (RRC) connection with the UE;
receive data radio bearer (DRB) capability of the UE; and
set up DRBs with the UE based on the received UE context, wherein the number of the DRBs is equal to the DRB capability of the UE, and wherein a first portion of the DRBs is set up during a first period and a second portion of the DRBs is set up during a second period, wherein the first period is before the first network receives the DRB capability of the UE and the second period is after the first network receives the DRB capability of the UE.

43. A method for wireless communications by a first network, comprising:
receiving a notification of a handover of a user equipment (UE) and a context associated with the UE from a second network, wherein the first network is different from the second network;
establishing radio resource control (RRC) connection with the UE;
receiving data radio bearer (DRB) capability of the UE; and
setting up DRBs with the UE based on the received UE context, wherein the number of the DRBs is equal to the DRB capability of the UE, and wherein setting up DRBs with the UE further comprises:
setting up a minimum number of DRBs as soon as the connection is established between the UE and the first network, wherein the minimum number of DRBs is equal to the smallest number of DRBs supported by all the UEs; and
setting up the remaining DRBs after the first network receives information about the DRB capability of the UE, wherein the remaining DRBs are not included in the minimum number of DRBs that are setup previously.

44. An apparatus for wireless communications by a first network, comprising:
logic for receiving a notification of a handover of a user equipment (UE) and a context associated with the UE from a second network, wherein the first network is different from the second network;
logic for establishing radio resource control (RRC) connection with the UE;
logic for receiving data radio bearer (DRB) capability of the UE; and
logic for setting up DRBs with the UE based on the received UE context, wherein the number of the DRBs is equal to the DRB capability of the UE, and wherein the logic for setting up DRBs further comprises:
logic for setting up a minimum number of DRBs as soon as the connection is established between the UE and the first network, wherein the minimum number of DRBs is equal to the smallest number of DRBs supported by all the UEs; and logic for setting up the remaining DRBs after the first network receives information about the DRB capability of the UE, wherein the remaining DRBs are not included in the minimum number of DRBs that are setup previously.

* * * * *